US009955501B2

(12) United States Patent
Lei et al.

(10) Patent No.: US 9,955,501 B2
(45) Date of Patent: Apr. 24, 2018

(54) SCHEDULING ENHANCEMENT IN WIRELESS COMMUNICATION

(71) Applicant: Microsoft Technology Licensing, LLC, Redmond, WA (US)

(72) Inventors: Haipeng Lei, Beijing (CN); Kodo Shu, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/592,091

(22) Filed: Jan. 8, 2015

(65) Prior Publication Data

US 2016/0183293 A1 Jun. 23, 2016

(30) Foreign Application Priority Data

Dec. 22, 2014 (WO) ................ PCT/CN2014/094504

(51) Int. Cl.
*H04W 72/14* (2009.01)
*H04W 24/02* (2009.01)
*H04W 72/04* (2009.01)

(52) U.S. Cl.
CPC ........... *H04W 72/14* (2013.01); *H04W 24/02* (2013.01); *H04W 72/0453* (2013.01)

(58) Field of Classification Search
CPC ......... H04W 72/1278; H04W 72/1294; H04W 72/14; H04W 72/12; H04W 72/1205; H04W 72/1263
See application file for complete search history.

(56) References Cited

U.S. PATENT DOCUMENTS

| 8,374,212 B2 | 2/2013 | Charbit et al. |
| 8,565,178 B2 | 10/2013 | Cheng et al. |
| 8,817,623 B2 | 8/2014 | Gupta et al. |
| 2009/0046693 A1* | 2/2009 | Nory ..................... H04W 52/08 370/343 |

(Continued)

FOREIGN PATENT DOCUMENTS

| WO | 2013167748 A1 | 11/2013 | |
| WO | WO 2014147673 A1 * | 9/2014 | ............... H04L 1/00 |

OTHER PUBLICATIONS

"International Search Report & Written Opinion for PCT Application No. PCT/US2015/067374", dated Mar. 23, 2016, 10 Pages.

(Continued)

*Primary Examiner* — Benjamin H Elliott, IV (57) ABSTRACT

The subject matter described herein relates to scheduling enhancement in wireless communication. A scheduling grant including an indicator can be generated, for example, at the base station (BS). The indicator included in the scheduling grant identifies multiple carriers to be scheduled with the scheduling grant. Upon receiving the scheduling grant, a device, for example, UE can recognize the multiple carriers scheduled with the single scheduling grant, and can detect corresponding data transmission in the multiple carriers accordingly. Compared with scheduling each carrier with independent scheduling grant, the proposed solution saves control signaling overhead, and thereby alleviates the problems caused by control signaling capacity limitation, and increase peak data rate and system throughput.

20 Claims, 4 Drawing Sheets

(56) References Cited

U.S. PATENT DOCUMENTS

| | | | |
|---|---|---|---|
| 2011/0075640 A1* | 3/2011 | Mo | H04L 5/0007 370/336 |
| 2011/0274074 A1* | 11/2011 | Lee | H04L 5/0053 370/329 |
| 2013/0039296 A1* | 2/2013 | Damnjanovic | H04W 72/1289 370/329 |
| 2013/0136027 A1* | 5/2013 | Matsuo | H04W 24/10 370/252 |
| 2013/0148619 A1* | 6/2013 | Ahn | H04W 52/365 370/329 |
| 2013/0188552 A1 | 7/2013 | Kazmi et al. | |
| 2013/0315152 A1 | 11/2013 | Ratasuk et al. | |
| 2014/0036853 A1 | 2/2014 | Kim et al. | |
| 2014/0043979 A1 | 2/2014 | Etemad et al. | |
| 2014/0071931 A1 | 3/2014 | Lee et al. | |
| 2014/0079015 A1 | 3/2014 | Kim et al. | |
| 2014/0098774 A1* | 4/2014 | Gao | H04L 5/001 370/329 |
| 2014/0126485 A1 | 5/2014 | Chen et al. | |
| 2014/0169346 A1* | 6/2014 | Futaki | H04J 11/0069 370/336 |
| 2014/0287769 A1* | 9/2014 | Taori | H04W 74/0808 455/450 |
| 2015/0139175 A1* | 5/2015 | Ratasuk | H04L 5/0051 370/330 |
| 2015/0256305 A1* | 9/2015 | Yerramalli | H04L 5/0032 370/311 |
| 2016/0007357 A1* | 1/2016 | Yano | H04L 1/00 370/329 |
| 2016/0183293 A1* | 6/2016 | Lei | H04W 72/14 370/329 |

OTHER PUBLICATIONS

Hoymann, Christian, "Licensed-Assisted Access (LTE for unlicensed spectrum)", Published on: Mar. 14, 2014 Available at: http://www.tuhh.de/ffv/WS/workshop_2014_1/ffv-2014-christian-hoymann.pdf.

Wei, Yongbin, "Evolution of LTE and LTE", in Proceedings of IEEE/CIC International Conference on Communications in China, Oct. 2014, 14 pages.

"U-LTE: Unlicensed Spectrum Utilization of LTE", In Huawei White Paper, Feb. 2014, 20 pages.

"DOCOMO and Huawei Confirm LTE Network over Unlicensed Spectrum", Published on: Aug. 21, 2014 Available at: https://www.nttdocomo.co.jp/english/info/media_center/pr/2014/0821_00.html.

Poole, Ian, "LTE CA: Carrier Aggregation Tutorial", Published on: Dec. 5, 2011 Available at: http://www.radio-electronics.com/info/cellulartelecomms/lte-long-term-evolution/4g-lte-advanced-carrier-channel-aggregation.php.

"Second Written Opinion", Application No. PCT/US2015/067374, dated Nov. 3, 2016, 5 pages.

"International Preliminary Report on Patentability", Application No. PCT/US2015/067374, dated Mar. 3, 2017, 6 pages.

* cited by examiner

SCHEDULING ENHANCEMENT IN WIRELESS COMMUNICATION

RELATED APPLICATIONS

This application claims priority to International Application No. PCT/CN2014/094504, filed on Dec. 22, 2014, and entitled "SCHEDULING ENHANCEMENT IN WIRELESS COMMUNICATION." This application claims the benefit of the above-identified application, and the disclosure of the above-identified application is hereby incorporated by reference in its entirety as if set forth herein in full.

TECHNICAL FIELD

The non-limiting and example embodiments of the present disclosure generally relate to wireless communications, and specifically to a method and apparatus for scheduling enhancement in wireless communications.

BACKGROUND

In wireless communication, the demand for high data rate keeps increasing and Long Term Evolution (LTE) developed by the third generation project partnership (3GPP) has been approved an extremely successful platform to meet such demand. The LTE system has been designed to operate in dedicated and licensed band to avoid interference with other systems and to guarantee satisfying communication performance However, with demand for high data rate keeps increasing and at the same time available licensed frequency resources keeps shrinking, more and more cellular network operators begin to consider utilization of the unlicensed spectrum as a complimentary tool to augment their service offering.

One alternative way for utilizing an unlicensed band is called "Licensed-Assisted Access (LAA)", which means the utilization of the unlicensed band is under control from the licensed band. LTE LAA is a topic to be studied in 3GPP LTE-Advanced Rel-13 and beyond. The objective of LTE LAA is to investigate the basic aspects for the operator-controlled non-standalone deployment of LTE in unlicensed spectrum, considering uplink and downlink or downlink only transmission in the unlicensed spectrum, to further improve network throughput and provide offloading capability to meet the demand of increasing traffic volume. Particularly, LTE LAA can use carrier aggregation (CA) to aggregate the carriers in unlicensed spectrum, i.e., using unlicensed carrier as a Supplemental Downlink or a Component Carrier. In such a scenario, a primary cell (also called PCell, primary carrier, or primary component carrier) for either a LTE frequency division duplex (FDD) or time division duplex (TDD) system can always operate in a licensed band to carry control signaling, mobility management and data, while one or more secondary cells (also called SCells, secondary carriers, or secondary component carriers herein) in unlicensed band can provide downlink (DL) and/or uplink (UL) data transmission for opportunistic capacity improvement.

SUMMARY

In a LTE LAA scenario, PCell operating in a licensed band provides control signaling while SCell operating on unlicensed band only provides data capacity in DL and/or UL. It means that DL and UL data transmissions in SCell have to be cross-carrier scheduled via physical downlink control channels (PDCCHs) in PCell. Conventionally, each scheduling for DL or UL data transmission requires independent downlink control information (DCI) transmission from a separate PDCCH. Hence, if the base station (BS) wants to schedule DL transmission on multiple SCells in same subframe, it has to send multiple independent PDCCHs corresponding to the multiple SCells besides self-scheduling in PCell.

However, in view of the limited DL control signaling capacity of the PCell which includes totally up to 3 OFDM symbols for PDCCH to carry physical control format indication channel (PCFICH), physical hybrid automatic repeat request (HARQ) indication channel (PHICH) and scheduling grants, simultaneous scheduling of multiple SCells may not be supported, especially when PCell is configured with a narrow bandwidth (e.g., 1.4 MHz), or the DCI for scheduling grant has to use high aggregation level (e.g., 4 or 8), or the scheduling occurs in a Special Subframe of TDD where only up to 2 OFDM symbols for PDCCH are available, or there are a large number of user equipment (UE) to be scheduled. Such a scheduling restriction due to control signaling capacity limitation may significantly reduce the achievable peak data rate and system throughput.

In accordance with embodiments of the subject matter described herein, the problem can be alleviated by scheduling multiple carriers with a single scheduling grant. To enable this, a scheduling grant including an indicator can be generated, for example, at the BS. The indicator included in the scheduling grant identifies multiple carriers to be scheduled with the scheduling grant. Upon receiving the scheduling grant, a device (for example, UE) can recognize the multiple carriers scheduled with the single scheduling grant, and can detect corresponding data transmission in the multiple carriers accordingly.

Compared with scheduling each carrier with independent scheduling grant, the proposed solution saves control signaling overhead, and thereby alleviates the problems mentioned above, and increase peak data rate and system throughput.

This Summary is provided to introduce a selection of concepts in a simplified form. The concepts are further described below in the Detailed Description. This Summary is not intended to identify key features or essential features of the claimed subject matters, nor is it intended to be used to limit the scope of the claimed subject matters.

BRIEF DESCRIPTION OF THE DRAWINGS

Embodiments of the subject matter described herein are illustrated by way of example and not limited in the accompanying figures in which like reference numerals indicate similar elements and in which.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Specifically, some examples of UEs include devices operable in unlicensed band.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
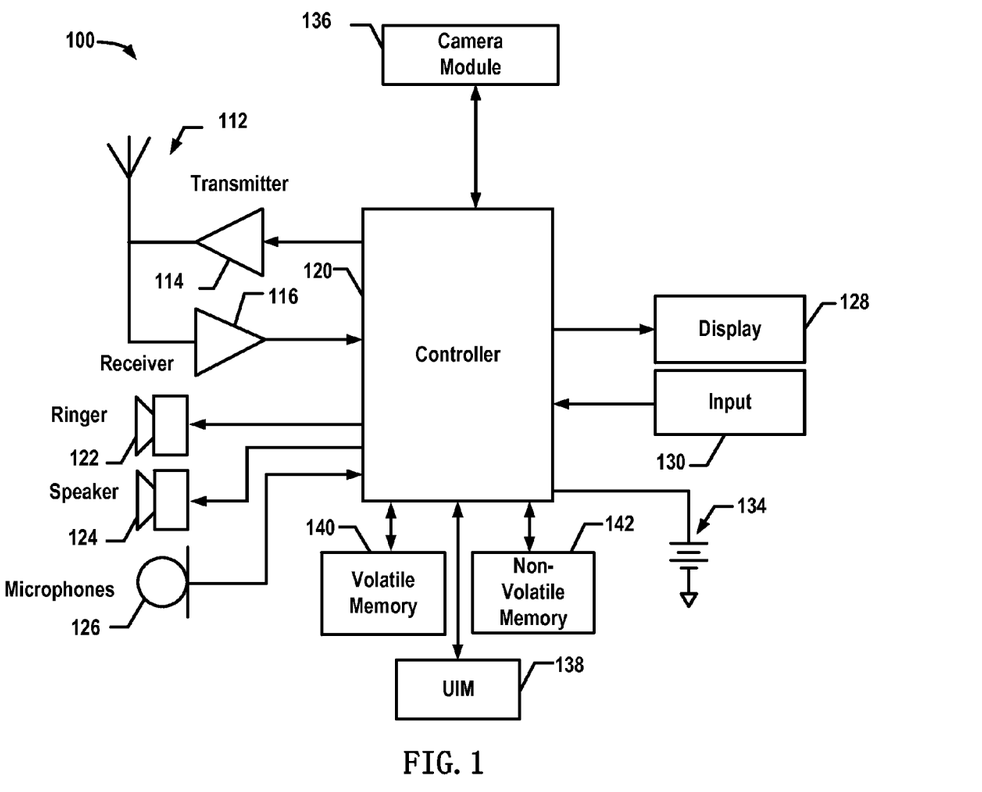
FIG. 1 illustrates a block diagram of user equipment in accordance with one embodiment of the subject matter described herein.

FIG. 1 illustrates a block diagram of a UE 100 in accordance with one embodiment of the subject matter described herein. In one embodiment, the UE 100 may be any device with a wireless communication capability, such as a mobile phone, a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

As shown, the UE 100 comprises one or more antennas 112 operable to communicate with the transmitter 114 and the receiver 116. With these devices, the UE 100 may perform cellular communications with one or more BSs. Specifically, the UE 100 may be configured to multiple carriers. That is, according to the grant and the resources allocated by the BS, the UE 100 may transmit or receive data via multiple carriers.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

Optionally, the UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the UE 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
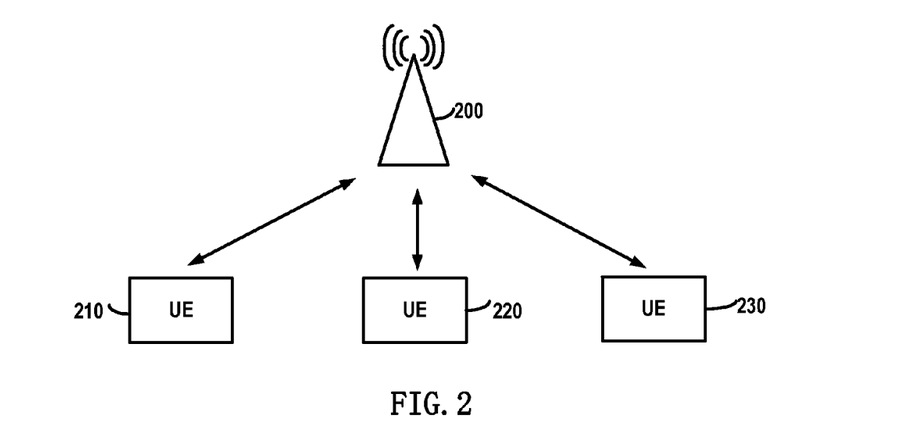
FIG. 2 illustrates a block diagram of an environment in which embodiments of the subject matter described herein may be implemented.

FIG. 2 shows an environment of a cellular system in which embodiments of the subject matter described herein may be implemented. As shown, one or more UEs may communicate with a BS 200. In this example, there are three UEs 210, 220 and 230. This is only for the purpose of illustration without suggesting limitations on the number of UEs. There may be any suitable number of UEs in communication with the BS 200. In one embodiment, one or more of the UEs 210, 220 and 230 may be implemented by the UE 100 as shown in FIG. 1, for example.

The communications between the UEs 210, 220 and 230 and the BS 200 may be performed according to any appropriate communication protocols including, but not limited to, the first generation (1G), the second generation (2G), 2.5G, 2.75G, the third generation (3G), the fourth generation (4G) communication protocols, and/or any other protocols either currently known or to be developed in the future. Though for illustration purpose, in some embodiment of the disclosure, the UEs 210, 220 and 230 and the BS 200 may communicate using 3GPP LTE technique, the embodiments of the present disclosure are not limited to such network scenarios.

In the a cellular system depicted in FIG. 2, the BS 200 may firstly provide service to an UE (e.g., UE 210) via a primary carrier (also called PCell, primary component carrier) and then the BS 200 may provide service to the UE via some additional secondary carriers (also called SCells or secondary component carriers) when more frequency resources are required to provide a higher peak data rate and/or throughput. In the case that the additional secondary carriers are in a shared band, e.g., an unlicensed band accessible to various other wireless networks or other cells, the interference level on these secondary carriers may be relatively high and may vary fast. In view of interference status on these SCells, important control signalings are preferably to be sent via the primary carrier only, while these secondary carriers are utilized only for data transmission. However, such a solution may face a problem of signaling capacity limitation in the primary carrier.

Figure 3A:
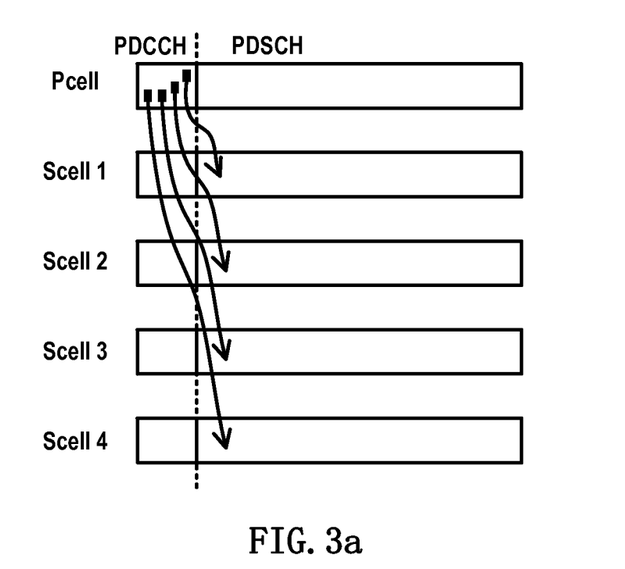
FIG. 3a illustrates a schematic diagram of conventional cross-carrier scheduling method.

As specified in the LTE specifications, e.g., 3GPP TS 36.211, the physical downlink control channel (PDCCH) carries scheduling grants and other control information. A physical control channel is transmitted on an aggregation of one or several consecutive control channel elements (CCEs), and the number of consecutive CCEs occupied by a physical control channel corresponds to an aggregation level, which could be, for example, 1, 2, 4, 8. The number of OFDM symbols used for transmission of PDCCHs in a subframe is indicated by the physical control format indicator channel (PCFICH). In accordance with current LTE specification, no more than three OFDM symbols can be used for transmission of PDCCHs for normal bandwidth scenario. Considering that conventionally each scheduling grant requires independent downlink control information (DCI) transmission from a separate PDCCH as illustrated in FIG. 3a, the number of scheduling grants that can be transmitted in a subframe is limited due to the limited PDCCH capacity. This number can be further reduced in many cases including, but not limited to, PCell is configured with a narrow bandwidth (e.g., 1.4 MHz) which provides less available CCEs, or a DCI for scheduling grant has to be sent with high aggregation level (e.g., 4 or 8) which means more CCEs occupied per DCI, or the scheduling occurs in the special subframe of TDD PCell where only up to two OFDM symbols are available for PDCCHs. Such a scheduling restriction due to control signaling capacity limitation may significantly reduce the achievable peak data rate and the system performance. For example, a BS may desire to transmit data to a UE via four SCells simultaneously to provide a high throughput and peak data rate. However, the available PDCCH resource may only afford one scheduling grant.

Figure 3B:
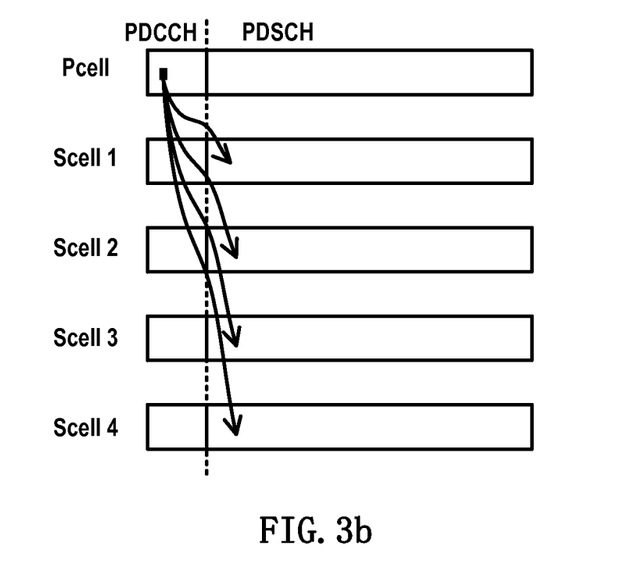
FIG. 3b illustrates a schematic diagram of enhanced cross-carrier scheduling method in accordance with an embodiment of the subject matter described herein.

In the embodiments of the subject matter described herein, methods and apparatus are provided to enable more efficient scheduling by facilitating scheduling multiple carriers with a single scheduling grant. As illustrated in FIG. 3b, different from the convention solutions as illustrated in FIG. 3a, embodiments of the subject matter described herein allows a single scheduling grant to schedule multiple carriers in one shot. Example embodiments will now be discussed.

Figure 4:
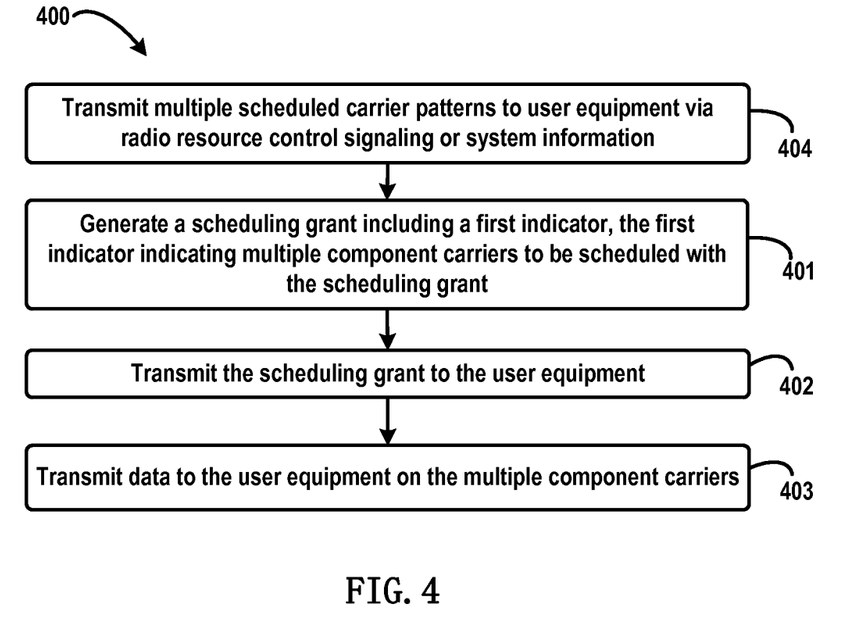
FIG. 4 illustrates a flowchart of a method for scheduling enhancement at the base station side in accordance with one embodiment of the subject matter described herein.

Reference is now made to FIG. 4 which illustrates a flow chart of an exemplary method 400 for scheduling enhancement in a wireless network in accordance with one embodiment of the subject matter described herein. In one embodiment, the method 400 may be implemented by the BS 200 as shown in FIG. 2, for example. It is to be understood that the subject matter described herein is not limited in this regard. In alternative embodiments, the method 400 may be implemented by any other suitable entities in the wireless communication system.

As shown, in one embodiment, the method 400 is entered at step 401, where the BS 200 generates a scheduling grant including a first indicator, the first indicator indicating multiple carriers to be scheduled with the scheduling grant. At step 402, the BS 200 transmits the scheduling grant to user equipment. Then the method 400 proceeds to step 403, where the BS 200 transmits data to the user equipment on the indicated multiple carriers.

The method 400 enables the scheduling of multiple carriers with a single scheduling grant. Compared with the conventional solutions where each carrier is scheduled with an independent scheduling grant, the scheduling overhead can be reduced, thereby enabling more carriers to be scheduled in limited control signaling resources.

In one embodiment, the first indicator included in the scheduling grant can be a bitmap indicating the multiple carriers. By way of example and without suggesting any limitations as to the scope, in one embodiment, the zeros "0" in the bitmap can be used to indicate the carriers that are not scheduled, while the ones "1" in the bitmap can be used to indicate the carriers that are scheduled by the scheduling grant. For example, a 4-bits bitmap "1010" can be used to indicate that the first and the third carriers among four configured secondary carriers are scheduled by said scheduling grant. It is to be understood that the number of bits in the bitmap is not limited to four. Instead, any suitable number can be used.

It is to be understood that various mappings between a bit in the bitmap and a carrier can be defined, and the scope of the subject matter described herein is not limited to any specific mapping. The length of the bitmap, i.e., number of bits for indication, can be predefined depending on one or more relevant factors. For example, in one embodiment, the length can be defined based on maximum number of carriers allowed to be aggregated. In another embodiment, the length may be configured by base station, for example, via radio resource control signaling, or system information.

Alternatively or additionally, in one embodiment, the first indicator can be implemented as an index indicating one of multiple scheduled carrier patterns. The scheduled carrier pattern indicates a combination of multiple carriers to be scheduled with the scheduling grant. For example, to enable scheduling of multiple carriers with a single grant, a Scheduled Carrier Pattern (SCP) can be defined. In current CA framework, a UE (e.g., UE 210 shown in FIG. 2) can be configured up to 4 SCells besides the PCell. It is noted that this embodiment is not limited only in case that maximum number of configured SCells is 4 and it can be extended to support more configured SCells, for example, when maximum number of configured SCells is set to 31, i.e., to support the maximum number of component carriers of 32. These configured SCells can locate in same unlicensed band and thus have similar channel profiles especially when interference avoidance mechanism (e.g., listen-before-talk) is adopted in the unlicensed band. Depending on the buffer status and the required data rate, a base station (e.g., BS 200 shown in FIG. 2) may decide to schedule one or more SCells for the UE. Assuming 4 SCells configured for the UE, there are up to 15 combinations of the SCells (i.e., $C_4^1 + C_4^2 + C_4^3 + C_4^4 = 15$, wherein $C_M^N$ means the number of combinations of selecting N carriers from M carriers) can be scheduled, as shown in Table 1. Each of the carrier combinations is called a SCP. It is to be understood that the carrier combinations listed in Table 1 are just for the purpose of illustration without suggesting any limitations as to the scope of the subject matter described herein. In other embodiments, the SCPs may involve different number of carriers and/or different carrier combinations especially in the case the maximum number of aggregated component carriers is 32.

TABLE 1

Example of Scheduled Carrier Patterns for 4 configured SCells.

| SCP index | SCell 1 | SCell 2 | SCell 3 | SCell 4 |
|---|---|---|---|---|
| 1 | ✓ | — | — | — |
| 2 | — | ✓ | — | — |
| 3 | — | — | ✓ | — |
| 4 | — | — | — | ✓ |
| 5 | ✓ | ✓ | — | — |
| 6 | — | ✓ | ✓ | — |
| 7 | — | — | ✓ | ✓ |
| 8 | ✓ | — | — | ✓ |
| 9 | — | ✓ | — | ✓ |
| 10 | ✓ | — | ✓ | — |
| 11 | ✓ | ✓ | ✓ | — |
| 12 | — | ✓ | ✓ | ✓ |
| 12 | ✓ | — | ✓ | ✓ |
| 14 | ✓ | ✓ | — | ✓ |
| 15 | ✓ | ✓ | ✓ | ✓ |

TABLE 2

Example of Scheduled Carrier Patterns and indexes dependent on the number of SCells scheduled

| SCP index | | | | | | | |
|---|---|---|---|---|---|---|---|
| 4 SCells scheduled | 3 SCells scheduled | 2 SCells scheduled | 1 SCell scheduled | SCell 1 | SCell 2 | SCell 3 | SCell 4 |
| — | — | — | 1 | ✓ | — | — | — |
| — | — | — | 2 | — | ✓ | — | — |
| — | — | — | 3 | — | — | ✓ | — |
| — | — | — | 4 | — | — | — | ✓ |
| — | — | 1 | — | ✓ | ✓ | — | — |
| — | — | 2 | — | — | ✓ | ✓ | — |
| — | — | 3 | — | — | — | ✓ | ✓ |
| — | — | 4 | — | ✓ | — | — | ✓ |
| — | — | 5 | — | — | ✓ | — | ✓ |
| — | — | 6 | — | ✓ | — | ✓ | — |
| — | 1 | — | — | ✓ | ✓ | ✓ | — |
| — | 2 | — | — | — | ✓ | ✓ | ✓ |
| — | 3 | — | — | ✓ | — | ✓ | ✓ |
| — | 4 | — | — | ✓ | ✓ | — | ✓ |
| 1 | — | — | — | ✓ | ✓ | ✓ | ✓ |

In Table 1, each index corresponds to a SCP, i.e., a combination of SCells being checked. To inform the UE which SCells are scheduled, the base station can include the index of the selected carrier combination in the scheduling grant. For example, the eNB can include an index of "5" in the scheduling grant to indicate the 5th SCP, i.e., SCell1 and SCell2 are scheduled with said scheduling grant. Similar as a bitmap solution, the index also enables to scheduling multiple carriers with a single scheduling grant, thereby reducing the control signaling overhead and alleviating the restriction caused by control signaling capacity.

In one embodiment, the multiple SCPs can be predefined in order to enable a common understanding between the base station and the UE regarding the interpretation of an index. For example, in one embodiment, one or more SCPs may be specified in advance and made known to both the UE and BS sides. In another embodiment, the multiple SCPs can be defined and transmitted by the BS to the UE. For example, in one embodiment, the SCPs may be transmitted via the radio resource control (RRC) signaling (either UE-specific or cell-specific RRC signaling) or via system information. As shown in FIG. 4, the transmission of SCPs can be performed at optional step 404.

In one further embodiment, at step 401, the generated scheduling grant can further include a second indicator. The second indicator specifies the number of secondary component carriers to be scheduled with that scheduling grant. In such an embodiment, the first indicator can be interpreted by the UE depending on the detected value of the second indicator. That is, the multiple carriers scheduled with the scheduling grant can be jointly determined based on both the first and second indicators. For example in Table 2, if the second indicator indicates that only one carrier is scheduled, the first indicator (e.g., SCP index) can be interpreted as indicating one of the 4 carriers. On the other hand, if the second indicator indicates that two carriers are scheduled, the first indicator can be interpreted as indicating one of the $C_4^2=6$ carrier combinations. By virtue of the second indicator, the number of bits requires for the first indicator can be reduced. For example, it is possible to use only two or three bits to indicate a combination of a specific number (e.g., 2 or 3) of carriers. The reduced number of bits means lower scheduling overhead and higher spectral efficiency.

In one embodiment, by use of the second indicator, the existing Carrier Indication Filed (CIF) in a scheduling grant specified in LTE for cross-carrier scheduling can be reused as the first indicator to specify which carriers are scheduled by the scheduling grant. For example, if the second indicator is set to 0, the CIF can be interpreted normally as in current specification to indicating which one of the carriers are scheduled. If the second indicator is set to 1, the CIF can be interpreted as indicating one combination of multiple carriers. In another example, the second indicator can be set to indicate a number of (for example, 2, 3, 4 or any other suitable number) carriers, and correspondingly, the CIF can be interpreted as indicating a combination of the carriers of that number.

In one embodiment, at step 401, the generated scheduling grant can further include at least one common scheduling parameter to be applied to the scheduled multiple carriers. For example, in one embodiment, the multiple carriers that are scheduled with a single scheduling grant can share same modulation and coding scheme (MCs), and/or share same physical resource block (PRB) index. As another example, the scheduled multiple carriers may adopt a common HARQ parameter, or certain power control parameters. In this way, the control signaling overhead can be further reduced.

In some embodiments, at step 402, the scheduling grant is transmitted via a primary component carrier in a licensed band, and at step 403, the data is transmitted over the scheduled multiple carriers in an unlicensed band. However, the embodiments of the subject matter described herein are not limited to such a scenario. Method 400 can also apply to a scenario where both the scheduling grant and the data are transmitted in a licensed band (i.e., the scheduling carrier and the scheduled carriers both locate in a licensed band), or both of them are transmitted in unlicensed bands (i.e., the scheduling carrier and the scheduled carriers both locate in unlicensed bands).

Figure 5:
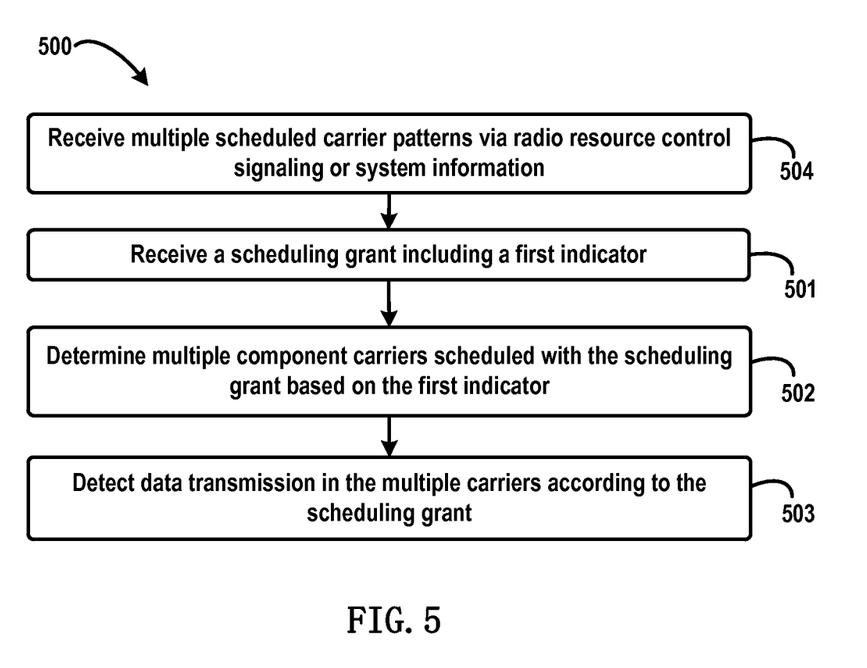
FIG. 5 illustrates a flowchart of a method for scheduling enhancement at the UE side in accordance with one embodiment of the subject matter described herein.

Reference is now made to FIG. 5 which illustrates a flow chart for an exemplary method 500 for scheduling enhancement in a wireless network in accordance with an embodiment of the subject matter described herein. The method 500 can be implemented by the UE such as UE 210 shown in FIG. 2, for example. It is to be understood embodiments of the subject matter described herein are not limited to this. In alternative embodiments, the method 500 can be implemented by any other suitable entities in the wireless communication.

As shown, in one embodiment, the method 500 is entered at step 501 to receive a scheduling grant including a first indicator. Next, at step 502, multiple carriers scheduled with the scheduling grant are determined based on the first indicator. Then at step 503, the data transmission in the multiple carriers is detected according to the scheduling grant. The method 500 enables the transmission and detection of data based on a single scheduling grant. In this way, the control signaling overhead and the computation complexity at the receiver (for example, at the UE side) can be significantly reduced.

As described above, in one embodiment, the first indicator included in the scheduling grant received at step 501 can be a bitmap indicating the multiple carriers. In one embodiment, the first indicator and the corresponding scheduling grant can be sent by a base station according to the method 400 described with reference to FIG. 4. All the features of the bitmap described with reference to method 400 also apply here. For example, in one embodiment, a 4-bit bitmap may be used. For example, the bitmap "1010" can be used to indicate that the first and the third carriers among four configured secondary carriers are scheduled by said scheduling grant. The length of the bitmap can be determined based on maximum number of carriers allowed to be configured, or specified by the BS via the radio resource control signaling or system information.

In one embodiment, the first indicator included in the scheduling grant received at step 501 can be an index indicating one of multiple SCPs, where the indicated SCP indicates a combination of multiple carriers to be scheduled with the scheduling grant. As described above, each SCP indicates a combination of one or more carriers to be scheduled with a single scheduling grant. As mentioned above, in one embodiment, the first indicator and the corresponding scheduling grant can be sent by the BS according to the method 400 described with reference to FIG. 4. All the features of the SCPs described with reference to method 400 also apply here. For example, the SCPs can be designed as shown in Table 1. However, it is to be understood that the carrier combinations listed in Table 1 is just for the purpose of illustration. In other embodiments, the SCPs may involve different number of carriers and/or different carrier combinations.

In one embodiment, the multiple SCPs can be predefined to enable a common understanding between the base station and the UE regarding the interpretation of an index. In another embodiment, the multiple SCPs can be transmitted, for example by the BS, to the UE via radio resource control (RRC) signaling (either UE-specific or cell-specific RRC signaling) or via system information. In such an embodiment, the method 500 may proceed to optional step 504, where the UE receives the multiple SCPs via radio resource control signaling (RRC) or system information. The RRC signaling can be UE-specific or cell-specific.

In one embodiment, in addition to the first indicator, the scheduling grant received at step 501 may include a second indicator which indicates the number of component carriers scheduled with the scheduling grant. In this embodiment, at step 502, the UE may interpret the meaning of the first indicator depending on the value of the second indicator. That is, the UE may determine the multiple carriers based on both the first and the second indicators.

In one embodiment, the UE may detect at least one common scheduling parameter from the scheduling grant received at step 501. These one or more common scheduling parameters are to be applied to the multiple carriers. Examples of the common scheduling parameters include, but are not limited to, a modulation and coding scheme, a physical resource block a HARQ related parameter, and/or power control related parameters. By allowing the data transmission in the multiple carriers to share a certain parameter(s), the overhead of scheduling signaling is further reduced.

In an embodiment, the UE may receive the scheduling grant at step 501 via a primary component carrier in a licensed band. In this embodiment, at step 503, the UE may detect the data transmission in the multiple carriers in an unlicensed band. Alternatively, both the scheduling grant and the data can be received in a licensed band. That is, the scheduling carrier and the scheduled carriers both locate in a licensed band. It is also possible that the scheduling grant and the data are both received in unlicensed bands.

Figure 6:
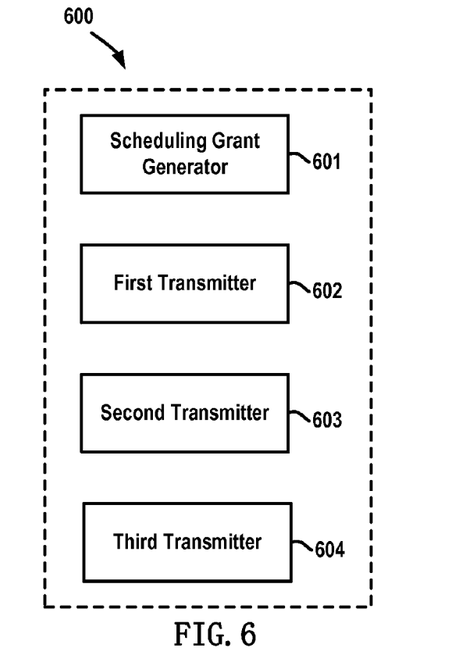
FIG. 6 illustrates a block diagram of an apparatus for scheduling enhancement at the base station side in accordance with one embodiment of the subject matter described herein.

FIG. 6 illustrates a block diagram of an apparatus 600 for scheduling enhancement in wireless communication in accordance with one embodiment of the subject matter described herein. The apparatus 600 can be implemented as the BS 200 shown in FIG. 2 or at least a part thereof. Alternatively or additionally, the apparatus 600 may be implemented as any other suitable entity in the wireless communication system. The apparatus 600 is operable to carry out the example method 400 described with reference to FIG. 4 and possibly any other processes or methods. It is also to be understood that the method 400 is not necessarily carried out by the apparatus 600. At least some steps of the method 400 can be performed by one or more entities.

Generally, all the features discussed above with reference to the method 400 apply to the apparatus 600. Specifically, as shown, the apparatus 600 comprises a scheduling grant generator 601 configured to generate a scheduling grant including a first indicator which indicates multiple carriers to be scheduled with the scheduling grant, a first transmitter 602 configured to transmit the scheduling grant to user equipment, and a second transmitter 603 configured to transmit data to the user equipment on the multiple carriers.

In one embodiment, the first indicator included in the scheduling grant generated by the scheduling grant generator 601 can be a bitmap indicating the multiple carriers.

In one embodiment, the first indicator included in the generated scheduling grant can be an index indicating one of multiple scheduled carrier patterns, the indicated scheduled carrier pattern indicating a combination of multiple carriers to be scheduled with the scheduling grant.

In one embodiment, the apparatus 600 further comprises a third transmitter 604 configured to transmit the multiple scheduled carrier patterns to the user equipment via radio resource control (RRC) signaling or system information. One example of the SCPs can be shown as Table 1.

In one embodiment, the multiple scheduled carrier patterns are predefined, e.g., are specified in LTE standard.

In one embodiment, the scheduling grant generator 601 is further configured to generate a scheduling grant including the first indicator indicating multiple carriers to be scheduled with the scheduling grant and at least one common one common scheduling parameter to be applied to the multiple carriers. In some embodiments, the at least one common scheduling parameter includes at least one of: a modulation and coding scheme, and a physical resource block. In some other embodiments, the at least one common scheduling parameter may include HARQ and/or power control related parameters.

In one embodiment, the scheduling grant generator 601 is further configured to generate a scheduling grant further including a second indicator which indicates the number of component carriers to be scheduled with the scheduling grant.

In one embodiment, the first transmitter 602 is further configured to transmit the scheduling grant to user equipment via a primary component carrier in a licensed band; and the second transmitter 603 is further configured to transmit data to the user equipment on the multiple carriers in an unlicensed band.

In one embodiment, the scheduling grant generator 601, the first transmitter 602, the second transmitter 603 and the third transmitter 604 can be configured to perform the steps 401 to 404 described with reference to FIG. 4, respectively, and thus operations described with reference to FIG. 4 also apply here.

Figure 7:
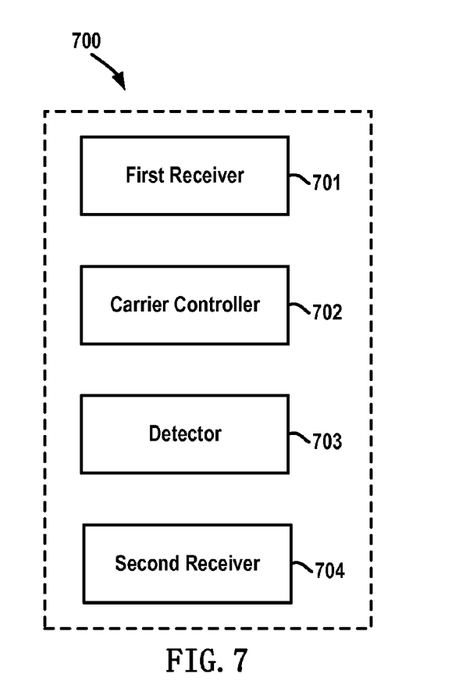
FIG. 7 illustrates a block diagram of an apparatus for scheduling enhancement at the UE side in accordance with one embodiment of the subject matter described herein.

FIG. 7 illustrates a block diagram of an apparatus 700 for scheduling enhancement in wireless communication in accordance with an embodiment of the subject matter described herein. The apparatus 700 can be implemented as the UE 210 shown in FIG. 2 or at least a part thereof. Alternatively or additionally, the apparatus 700 may be implemented as any other suitable entity in the wireless communication system. The apparatus 700 is operable to carry out the example method 500 described with reference to FIG. 5 and possibly any other processes or methods. It is also to be understood that the method 500 is not necessarily carried out by the apparatus 700. At least some steps of the method 700 can be performed by one or more entities.

Generally, all the features discussed above with reference to the method 500 apply to the apparatus 700. As shown, in one embodiment the apparatus 700 comprises a first receiver 701, configured to receive a scheduling grant including a first indicator, a carrier controller 702, configured to determine multiple carriers scheduled with the scheduling grant based on the first indicator, and a detector 703, configured to detect data transmission in the multiple carriers according to the scheduling grant.

In one embodiment, the first indicator received by the first receiver 701 may be a bitmap indicating the multiple carriers or an index indicating one of multiple scheduled carrier patterns, the indicated scheduled carrier pattern indicating a combination of multiple carriers to be scheduled with the scheduling grant.

In one embodiment, the apparatus 700 further comprises a second receiver 704, configured to receive the multiple scheduled carrier patterns via radio resource control signaling or system information. In still another embodiment of the subject matter described herein, the multiple SCPs are predefined, e.g., in a LTE standard.

In one embodiment, the scheduling grant received by the first receiver 701 further comprises a second indicator which indicates the number of component carriers to be scheduled with the scheduling grant, and the carrier controller 702 is further configured to determine multiple carriers scheduled with the scheduling grant based on the first indicator and the second indicator.

In one embodiment, the first receiver 701 is further configured to detect from the scheduling grant at least one common scheduling parameter to be applied to the multiple carriers. In one embodiment, the at least one common scheduling parameter includes at least one of: a modulation and coding scheme, and a physical resource block. But embodiments of the subject matter described herein are not limited to this. For example, the at least one common scheduling parameter may include HARQ and/or power control related parameters.

In one embodiment, the first receiver 701 is configured to receive the scheduling grant via a primary component carrier in a licensed band, and the detector 703 is configured to detect data transmission in the multiple carriers comprises detecting data transmission in the multiple carriers in an unlicensed band. However, the embodiments of the subject matter described herein are not limited to such a scenario. The apparatus 700 can also apply to a scenario where both the first receiver 701 and the detector 703 are configured to receive in a licensed band (i.e., the scheduling carrier and the scheduled carriers both locate in a licensed band), or both of them are configured to receive in unlicensed bands (i.e., the scheduling carrier and the scheduled carriers both locate in unlicensed bands).

The modules/units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In addition, some units or modules in the systems 600 and 700 can be combined in some implementations. For example, in one embodiment, it is possible to use a single physical transmitter to serve as the first, second and third transmitters in the system 600 as discussed with reference to FIG. 6. Likewise, a single physical receiver may serve as the first and second receivers in the system 700 as discussed with reference to FIG. 7.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of wireless communication, comprising:
generating a scheduling grant including a power control parameter and a first indicator, the first indicator indicating multiple carriers to be scheduled with the scheduling grant, the first indicator comprising at least one of:
a bitmap indicating the multiple scheduled carriers, a length of the bitmap being based at least in part on a maximum number of the multiple carriers allowed to be scheduled; or
an index indicating one of multiple scheduled carrier patterns, the indicated scheduled carrier pattern indicating a combination of multiple carriers to be scheduled with the scheduling grant;
transmitting the scheduling grant to a user equipment in one or more unlicensed bands as a single grant for the combination of multiple carriers; and
transmitting data to the user equipment on the multiple carriers according to the power control parameter included in the scheduling grant, the transmitting the data in the one or more unlicensed bands.

2. The method of claim 1, further comprising:
transmitting the multiple scheduled carrier patterns to the user equipment via radio resource control signaling or system information.

3. The method of claim 1, wherein the generating a scheduling grant comprises:
including a second indicator into the scheduling grant, the second indicator indicating the number of component carriers to be scheduled with the scheduling grant.

4. The method of claim 1, wherein the generating a scheduling grant comprises:
including into the scheduling grant at least one common scheduling parameter to be applied to the multiple carriers.

5. The method of claim 4, wherein the at least one common scheduling parameter includes at least one of: a modulation and coding scheme, and a physical resource block index.

6. The method of claim 1, wherein the transmitting the scheduling grant comprises transmitting the scheduling grant via a primary component carrier in a licensed band.

7. The method of claim 1, wherein the generating the scheduling grant is responsive to a buffer status.

8. A method of wireless communication, comprising:
receiving a scheduling grant including a power control parameter and a first indicator, the first indicator comprising a bitmap indicating multiple scheduled carriers, a length of the bitmap being based at least in part on a maximum number of carriers allowed to be scheduled with the scheduling grant;
determining multiple carriers scheduled with the scheduling grant based on the first indicator; and
detecting data transmission according to the power control parameter included in the scheduling grant in the multiple carriers according to the scheduling grant, the scheduling grant received in and the data transmission detected in one or more unlicensed bands, and the scheduling grant received as a single grant for the multiple scheduled carriers.

9. The method of claim 8, further comprising:
receiving the bitmap via radio resource control signaling or system information.

10. The method of claim 8, wherein the receiving a scheduling grant comprises:
receiving the scheduling grant including the first indicator and a second indicator, the second indicator indicating the number of component carriers to be scheduled with the scheduling grant, and wherein the determining multiple carriers scheduled with the scheduling grant based on the first indicator comprises:
determining the multiple carriers scheduled with the scheduling grant based on the first indicator and the second indicator.

11. The method of claim 8, further comprising:
detecting, from the scheduling grant, at least one common scheduling parameter to be applied to the multiple carriers.

12. The method of claim 11, wherein the at least one common scheduling parameter includes at least one of: a modulation and coding scheme, and a physical resource block index.

13. The method of claims 8, wherein the receiving a scheduling grant comprises receiving the scheduling grant via a primary component carrier in a licensed band.

14. The method of claim 8, wherein zeros in the bitmap indicate carriers that are not scheduled and ones in the bitmap indicate carriers that are scheduled by the scheduling grant.

15. An apparatus for wireless communication, comprising:
a scheduling grant generator configured to generate a scheduling grant including a first indicator which indicates multiple carriers to be scheduled with the scheduling grant and at least one common scheduling parameter to be applied to the multiple carriers, the first indicator comprising a table index indicating one of multiple scheduled carrier patterns in a table of the multiple scheduled carrier patterns, the indicated scheduled carrier pattern indicating a combination of multiple carriers to be scheduled with the scheduling grant;
a first transmitter configured to transmit the scheduling grant to a user equipment in one or more unlicensed bands as a single grant for the combination of multiple carriers; and
a second transmitter configured to transmit data to the user equipment on the multiple carriers in the one or more unlicensed bands.

16. The apparatus of claim 15, further comprising:
a third transmitter configured to transmit the multiple scheduled carrier patterns to the user equipment via radio resource control signaling or system information.

17. The apparatus of claim 15, wherein the scheduling grant generator is configured to generate the scheduling grant further including a second indicator, the second indicator indicating the number of component carriers to be scheduled with the scheduling grant.

18. The apparatus of claim 15, wherein the at least one common scheduling parameter includes at least one of: a modulation and coding scheme, and a physical resource block index.

19. The apparatus of claim 15, wherein the first transmitter is configured to transmit the scheduling grant to user equipment via a primary component carrier in a licensed band.

20. The apparatus of claim 15, wherein the at least one common scheduling parameter includes a common hybrid automatic repeat request (HARQ) parameter.

* * * * *